May 28, 1940.  S. MAURER  2,202,110

WOODWORK INCISING MACHINE

Filed June 1, 1938  4 Sheets-Sheet 1

SAM MAURER
INVENTOR.
BY
ATTORNEY.

May 28, 1940.  S. MAURER  2,202,110
WOODWORK INCISING MACHINE
Filed June 1, 1938  4 Sheets-Sheet 2

SAM MAURER
INVENTOR
BY Harold L. Cook
ATTORNEY.

May 28, 1940.  S. MAURER  2,202,110
WOODWORK INCISING MACHINE
Filed June 1, 1938  4 Sheets-Sheet 3
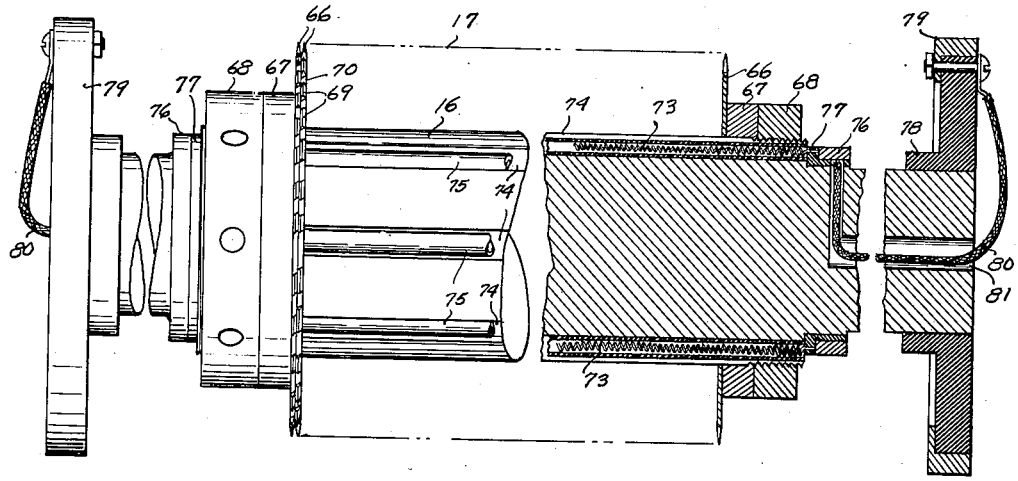
Fig. 4
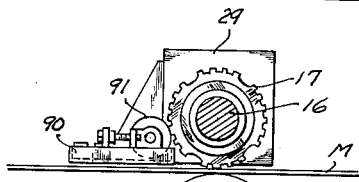
Fig. 9
Fig. 5
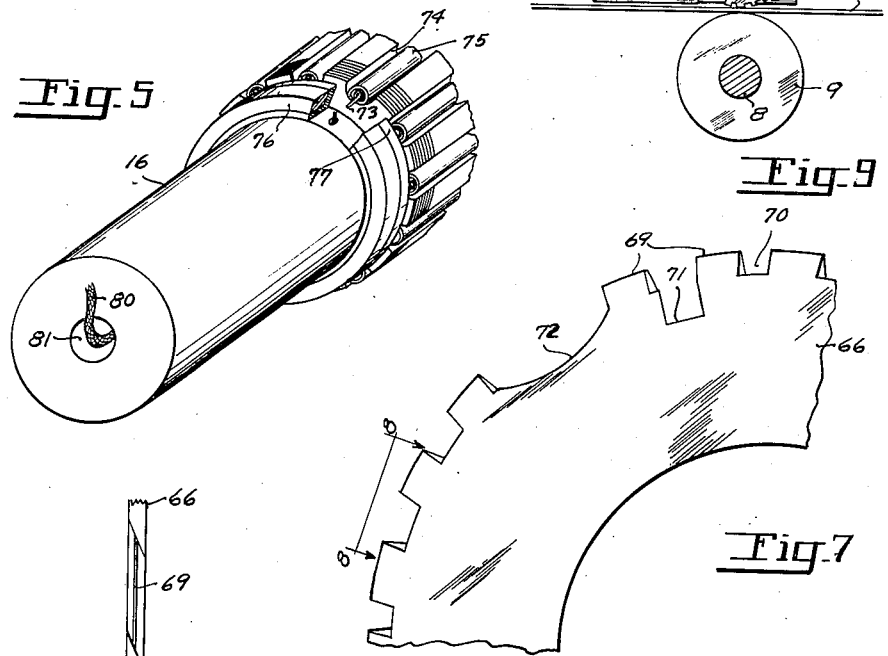
Fig. 7
Fig. 8
SAM MAURER
INVENTOR
BY Harold L. Cook
ATTORNEY May 28, 1940.　　　　S. MAURER　　　　2,202,110
WOODWORK INCISING MACHINE
Filed June 1, 1938　　　　4 Sheets-Sheet 4

SAM MAURER
INVENTOR
BY Harold L. Cook
ATTORNEY.

Patented May 28, 1940

2,202,110

UNITED STATES PATENT OFFICE 2,202,110

WOODWORK INCISING MACHINE

Sam Maurer, Vancouver, British Columbia, Canada, assignor to M and M Wood Working Company, Portland, Oreg., a corporation of Oregon Application June 1, 1938, Serial No. 211,132

8 Claims. (Cl. 101—24)

This invention relates to machines for incising wood and similar products, and has particular reference to an apparatus for forming cuts or incisions beneath the surfaces of such products for creating designs of predetermined character thereon.

It is an object of the invention to provide a machine for imparting to the surface of wood and similar products a multiplicity of closely spaced, small incisions arranged in a predetermined pattern.

It is a further object of the invention to provide a machine for forming cuts or incisions beneath the surface of soft wood without crushing the surface of the wood.

It is a further object of the invention to provide a machine for incising the surface of wood with a multiplicity of small, closely spaced incisions, said machine having an incisor so treated as to cause it to uniformly and evenly incise said surface.

It is a further object of the invention to provide a wood incising machine having an incisor, the relation of the operative parts of which may be so varied at the will of an operator as to incise the lines of any one of a multiplicity of patterns in the surface of the material to be treated.

It is a further object of the invention to provide a machine for incising the surface of wood with a multiplicity of small, closely spaced incisions to create a continuous pattern of relatively small figures, and for thereafter incising said surface with a smaller number of relatively large incisions to create a continuous pattern of relatively large figures.

Incisions are made by passing the material in contact with an incising roller made up of a series of steel discs or blades having their peripheral edges sharpened to a thin, V-shaped cutting edge. Notwithstanding these blades are razor sharp, it is necessary to press the incising roller upon the material under considerable pressure to cause the blades to penetrate the surface of the wood. For example, when the material being incised is Douglas fir, each blade must be pressed against the surface of the wood under approximately 50 pounds pressure to cause the blade to enter the wood. Douglas fir, like many of the so-called soft woods, has a grain which consists of alternately arranged hard and soft fibers, and under such pressure as above mentioned, the soft fibers which lie beneath the hard fibers on the surface of a board are compressed and the surface is more often crushed than incised.

Applicant has discovered that by first heating the incising blades and then pressing them upon the wood, the blades will penetrate the wood evenly and uniformly without any tendency to crush the surface. The incising blades are not heated sufficiently to brand or burn the wood during the momentary period of contact therewith, although the optimum temperature to which the blades are heated for the purpose is between 700° and 800° F.

This application is a continuation in part of an application for United States Letters Patent filed August 17, 1936, for Woodwork incising machines, which application is identified as Serial No. 96,396.

With the above and other objects and advantages in mind, the invention resides in the novel construction and combination of parts hereinafter described, illustrated in the accompanying drawings and set forth in the appended claims: it being understood that various changes in form, proportion, size and details of construction within the scope of the claims may be resorted to without departing from the spirit or sacrificing any of the advantages of the invention.

In the drawings:

Figure 4 is a longitudinal elevation of the incising roller, partly in section, particularly illustrating the elements for heating the incising blades and the elements for conducting electrical energy thereto.

Figure 5 is a perspective view of one end of the incising roller shaft, particularly illustrating the electrical connection for the heating elements.

Figure 7 is a fragmentary side elevation of an incising blade.

Figure 8 is a fragmentary edge view of an incising blade taken on the line 8—8 of Figure 7.

Figure 9 is a side elevation of the apparatus for applying color to the incising blades.

Figure 2:
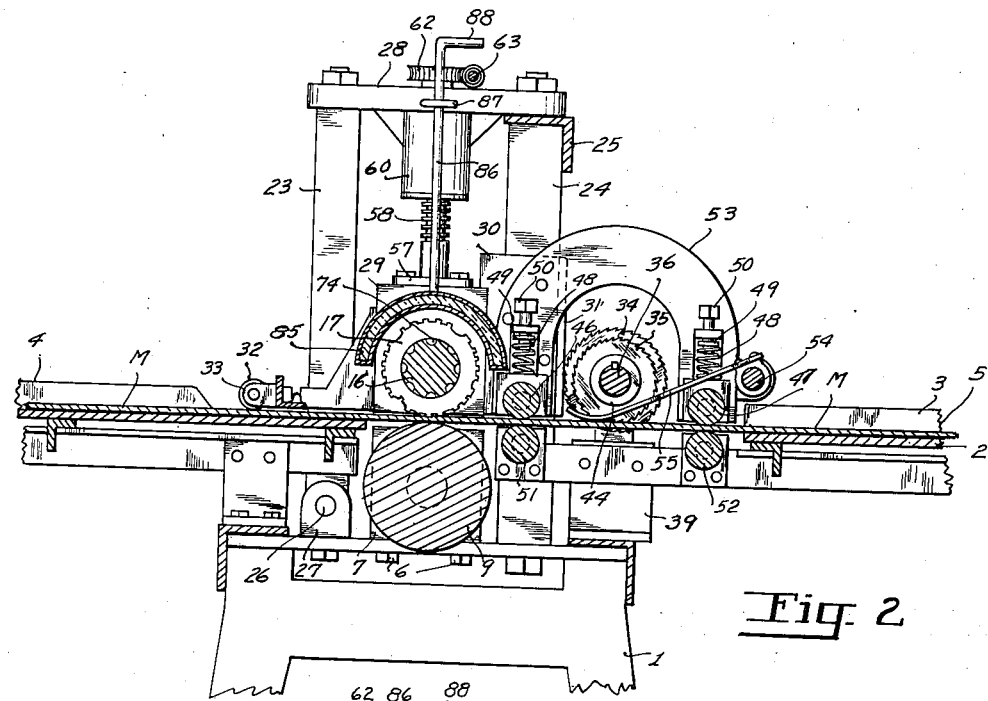
Figure 2 is a longitudinal sectional elevation of the machine illustrated in Figure 1.
Figure 1:
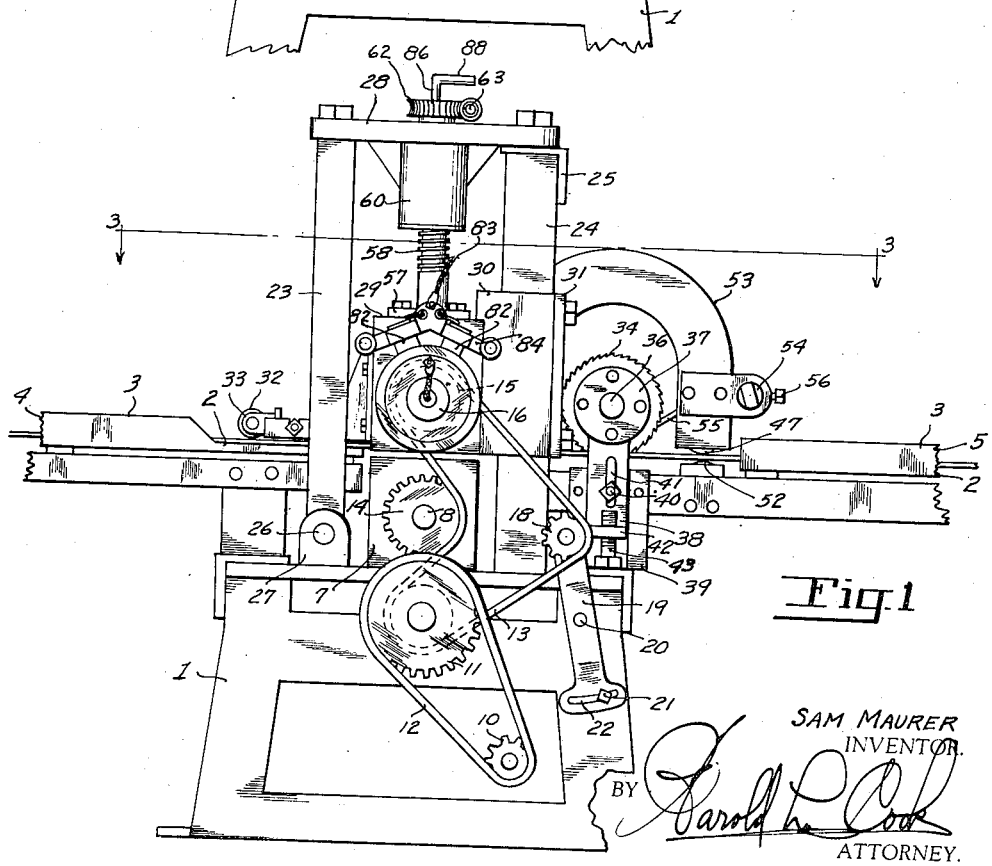
Figure 1 is a side elevation of a wood incising machine embodying the principles of the present invention.

As illustrated in the drawings, the machine comprises a base 1 forming a support for a table 2 having side walls 3, which table is divided into a feed end 4 and a delivery end 5. Secured to the base, as by stud bolts 6, are oppositely disposed bearing blocks 7—7, and journaled therein is a shaft 8 upon which is mounted a feed roll 9. The shaft 8 is driven by means of a train of sprockets and chains which include the drive sprocket 10, a reduction sprocket 11, and drive chains 12 and 13. The chain 13 is trained around a sprocket 14 keyed to the end of the shaft 8, and around a sprocket 15 keyed to the end of the shaft 16 upon which is mounted the incising roll 17. Although the diameters of the feed roll 9 and of the incising roll 17 are not equal, these rolls are driven at the same peripheral speed, the size and pitch of the sprockets which are keyed to their respective shafts being varied according to the size of the roll. An idler sprocket 18 is mounted on the free end of an arm 19 for tightening the chain 13. The arm 19 is pivoted upon the base at 20, and may be adjusted to hold the idler sprocket 18 against the pull of the chain 13 by means of a bolt 21 which engages through a slot 22 in the end of the arm.

For purposes of description it may be said that the machine is divided horizontally on the plane of the table 2. Above the plane of the table is positioned the apparatus for incising the surface of the material M to create the desired patterns. Below the plane of the table is positioned the apparatus for supporting the material M and feeding it through the machine. All of the operative mechanism above the plane of the table is adjustable vertically to accommodate material of various thicknesses; whereas all of the operative mechanism below the plane of the table is mounted in fixed position.

Mounted upon the base 1 at opposite sides of the table 2 are upright standards 23—23 and 24—24. The standards 24—24 are fixed permanently in upright position, and are braced transversely of the machine by an angle iron 25. The standards 23—23 are each pivoted at its lower end upon a pin 26 anchored in a shackle bolt 27, which permits the standard to be moved from its vertical position to a horizontal position to permit access to the bearings for the incising roll. The two standards 23 and 24 at each side of the machine are interconnected across the upper ends thereof by a cross member 28 which forms a support for the mechanism for adjusting the elevation of the incising roll 17 and associated parts.

The shaft 16 for the incising roll 17 is journaled in bearing blocks 29—29, each of which is integral with a U-shaped bracket 30, and one of such brackets is mounted for vertical movement over each of the standards 24—24. A plate 31 is bolted to the open side of each bracket 30 to hold the bracket in engagement with the standard.

As the material to be incised is fed over the table 4 toward the incising roll 17 it is first engaged by rollers 32 journaled in bearings 33 carried upon a framework secured to the bearing blocks 29—29. These rollers 32 are spaced apart across the width of the feed table 4 and serve to hold the material flat upon the table as it is fed under the incising roll. After the material has been incised it is engaged by trimming saws 34 and scoring saws 35, from whence it is delivered onto the delivery table 5.

Figure 3:
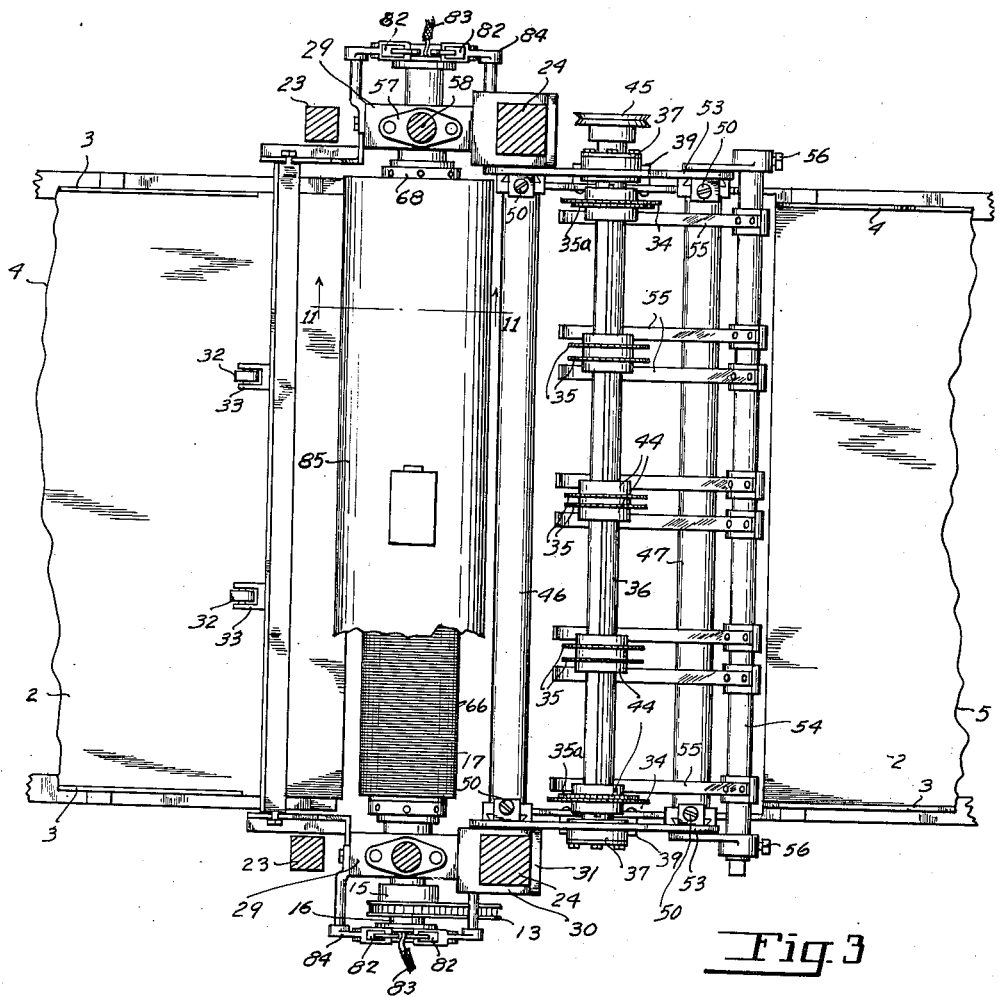
Figure 3 is a plan view of the machine illustrated in Figures 1 and 2, taken on the line 3—3 of Figure 1.

The trimming saws 34 and scoring saws 35 are mounted upon a shaft 36 which is journaled in bearings 37—37. Each of the bearings 37—37 is mounted upon the upper end of a plate 38 slidably mounted in a grooved block 39, vertical movement of the plate 38 being limited by a belt 40 which engages through a slot 41 in the plate. Each of the plates 38 is flanged at 42, and threadedly engaging each flange 42 is a set screw 43 by means of which to adjust the elevation of the saws. Each of the saws is mounted upon an arbor 44 adapted to be keyed to the shaft 36, and the saws may be positioned along the shaft to divide the material, or to effect any pattern of scoring thereon, as may be desired. In Figure 3 of the drawings the trimming saws are illustrated as being positioned adjacent the ends of the shaft 36 to trim the edges of material which may be as wide as the full width of the table; whereas the scoring saws are so positioned as to create a series of spaced double lines across the surface of the material.

Figure 12:
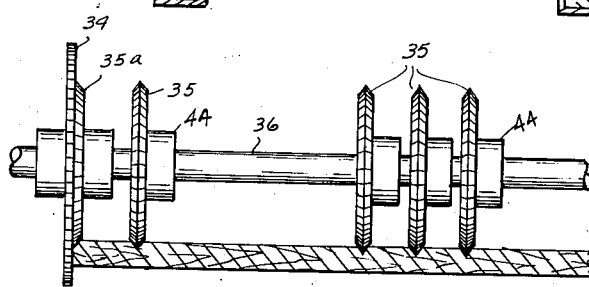
Figure 12 is an edge elevation of the saws for grooving the surface of the incised material.
Figure 13:
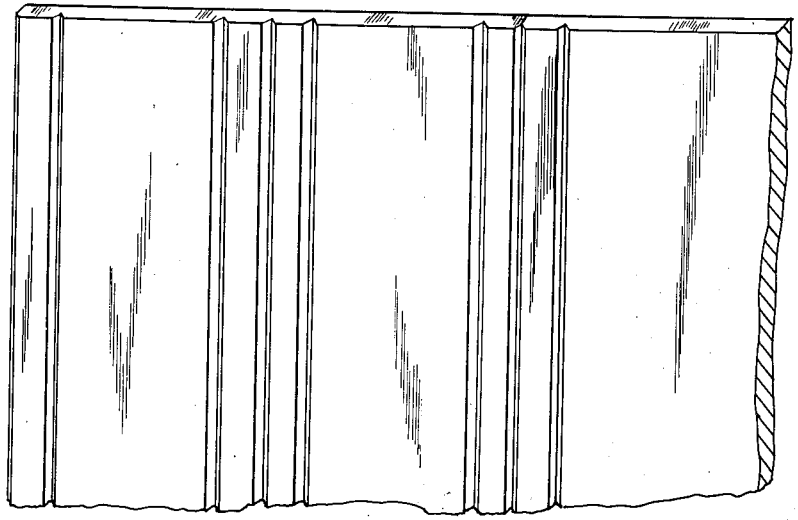
Figure 13 is a plan view of incised boards placed in edge to edge relation, and showing the manner in which the joint is camouflaged by the pattern created by the saws.

By referring to Figures 3 and 12, it will be noted that one scoring saw, identified at 35a, is positioned in face to face contact with each of the trimming saws 34, so that there is no space between the groove created in the surface of the material by the scoring saw 35a and the edge of the material after it is trimmed. Each saw 35a is but one-half as thick as the scoring saws 35, and so cuts a groove in the surface of the material but one-half as wide as the grooves cut by the saws 35. When pieces of material which have been so grooved are placed in edge to edge abutment, as illustrated in Figure 13, the half grooves created by the saws 35a are conjoined and together create a groove of the same width and of the same appearance as grooves created by the saws 35. Power to operate the saws may be supplied from any suitable source to the pulley 45 keyed to the end of the shaft 36.

Positioned between the saws and the incising roll, and between the saws and the delivery table, are hold-down rollers 46 and 47, which serve to prevent the material from being lifted or buckled by the action of the saw teeth. These rollers are yieldably urged against the material by compression springs 48—48, the upper ends of the springs being seated against collars 49—49 which are adjustable vertically by set screws 50—50 for relieving or increasing the pressure exerted by the springs. Bed rollers 51 and 52 are positioned beneath the rollers 46 and 47, in vertical alignment therewith, for supporting the material passing under the saws.

The rollers 46 and 47 are journaled in bearings mounted on oppositely disposed arched frame members 53—53 which, in turn, are mounted on the brackets 30—30. Also mounted on the arched frame members is a shaft 54 upon which are mounted a series of flat springs 55 adapted to bear upon material passing under the saws. Preferably, one such spring is provided for each one of the saws. The shaft 54 may be rotated to adjust the pressure exerted upon the material by the springs 55, and is secured by set screws 56.

Figure 10:
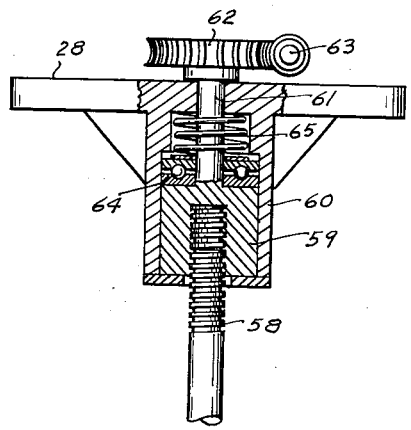
Figure 10 is a sectional elevation of the lift housing, showing the mechanism for elevating the incising roller and associated parts.
Figure 11:
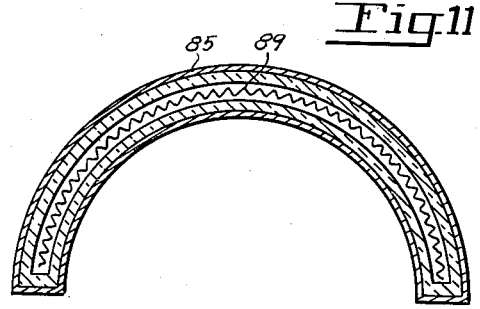
Figure 11 is a transverse sectional elevation of the hood for the incising roller taken on the line 11—11 of Figure 3, showing one of the auxiliary heating elements.

As has been stated, all of the operative mechanism above the plane of the table 2 is adjustable vertically to accommodate material of differing thicknesses. As will become apparent from the foregoing description, all such mechanism, with the exception of the saws, is mounted upon frame members secured or affixed to the bearing blocks 29—29 or to the brackets 30—30, these last mentioned elements being constituent parts of an integrate whole and movable as such. Affixed to the top of each bearing block 29, as by a collar or plate 57, is a screw 58 which is adapted to be engaged by a nut 59, one of which is housed in each of the cylindrical housings 60—60 supported by the cross members 28—28. (See Figure 10). Each nut 59 forms the lower end of a shaft 61, and is rotatable to engage or disengage the screw 58 by means of a screw wheel 62. The nuts 59 being maintained at a fixed elevation, rotation thereof serves to lift or lower the bearing blocks 29 and all the operative mechanism affixed therein. Operation of the screw wheel is under control of a screw shaft 63 operable by means of a crank (not shown). Each shaft 61 is equipped with a thrust bearing 64, and disposed between the thrust bearing and the cross member 28 is a compression spring 65 as a means of preventing injury to the incising roller should a piece of material of added thickness inadvertently be fed through the machine.

Figure 6:
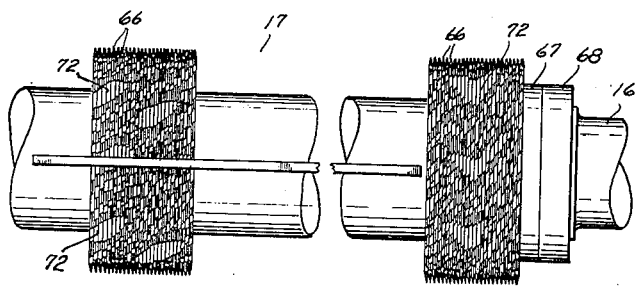
Figure 6 is a fragmentary longitudinal elevation of the incising roller showing some of the incising blades in neutral position, and some of the blades in rotated position to effect an irregular pattern.

Mounted upon the shaft 16 is a plurality of annular discs 66, shown in detail in Figures 6, 7 and 8, which form the incising roll 17. The discs 66 are clamped upon the shaft between locking rings 67—67, these being caused to bear against the outermost discs 66 by means of nuts 68—68. The locking rings 67—67 engage a keyway in the shaft so as to be non-rotatable when engaged by the nuts 68. When so clamped between the locking rings, the discs 66 are held in non-rotative position.

The peripheral edge of each disc 66 is serrated to form spaced incisors 69, both faces of which are beveled to form thin, sharp cutting edges. The notches 70 which separate adjacent incisors 69 are formed at an angle of approximately 45° to the plane of the disc, so that the ends of each incisor are pointed rather than squared. An incisor having a squared or blunt end tends to tear or lift the fibers of the material as the incisor pulls out of the incision, and this action is avoided by the use of incisors which are pointed at the ends, such as are produced by cutting angular notches 70 between incisors.

Each one of the discs 66 is grooved at one point on the periphery thereof as at 71, these grooves having a distinctive form for easy identification. When all of the grooves 71 are in alignment longitudinally of the roll, as illustrated in Figure 6, the discs 66 may be said to be in neutral position, in which position the serrations 72 produce a regular pattern. When a general change in design is desired, the nuts 68 may be slackened to release the locking rings 67, and the discs varied as to radial position to produce any desired pattern. After a particular pattern has been run, the original pattern may be restored by releasing the locking rings 67—67 and realigning the grooves 71, which forms a starting point from which an operator may rotate the individual discs upon the shaft 16 to create a new pattern.

A particular feature of the invention is the provision for heating the incisors 69. Applicant has discovered that by heating the incisors they cut into the wood evenly, the resulting incisions corresponding exactly to the size of the incisors, and being of uniform depth. When the incisors are unheated, they do not always sharply sever the surface of the material, but more often are pushed into the wood without cutting it and, instead of creating a sharp, neat incision, create a depression in the surface having no well-defined edges. Although the optimum temperature to which the incisors are heated for the purpose is between 700° and 800° F., the momentary period during which the incisors contact the wood is not sufficient to brand or burn the wood. In this connection, it is not intended to limit the application of the invention to any particular degree of heat, except that it shall be less than that sufficient to cause the incisors to brand or burn the material during momentary contact therewith.

Applicant's incising roll 17 is heated by electrical heating elements 73, these being disposed in longitudinal grooves 74 arranged peripherally of the shaft 16. The grooves 74 are deep enough to permit the heating elements 73 to lie therewithin without interfering with movement of the discs 66 over the shaft. The heating elements are insulated from the shaft 16 and from the annular discs 66 by means of heat conducting insulators 75. All of the heating elements 73 are connected, at each end of the shaft, to a distributor ring 76, by means of which electrical energy is distributed uniformly to each of these elements. Each of the distributor rings 76 is insulated from the shaft by means of an insulating ring 77, the connections for the respective heating elements being extended therethrough.

Secured to each end of the shaft 16 is an insulated hub 78 to which is affixed a brass collector ring 79. Each collector ring 79 is electrically connected to the distributor ring 76 by means of a cable 80 which extends longitudinally of the shaft 16 through a bore 81 to the point of connection. Each collector ring 79 is adapted to rotatively engage contact brushes 82—82 through which power is supplied to the collector ring from the cable 83. The brushes 82—82 are supported upon brackets 84—84 bolted to the bearing blocks 29—29. It will be understood that both ends of the shaft 16 are identically equipped with mechanism as above described to provide a complete circuit for the flow of electrical energy.

For preventing dissipation of heat from the incising roll 17 by radiation, there is provided an insulating shield or cover 85 which is co-extensive with the roll and which incloses the upper half thereof. The cover 85 is supported in juxtaposition the roll 17 by means of rods 86 which engage through eyelets 87 on the cross member 28, the ends of the rods 86 forming handles 88 by means of which to lift the cover away from the roll.

Disposed in each end of the insulated cover 85 is an auxiliary heating element 89 for heating the adjacent end portions of the incising roll by radiation. The heating elements 89 are intended to make up heat losses from the ends of the incising roll due to the exposure of the ends thereof to drafts and air currents which flow over the edge of the table.

In order that the incising roll 17 may impart a desired color to the incisions, I arrange in contact with its periphery an apparatus for applying ink or coloring material to the incisors 69.

This apparatus comprises a tank 90 suitably secured to the frame and containing the desired dye, stain or color material. Mounted in the tank 90, in such manner as to transfer the color to the incisors 69, is a roller 91, the normal operation of the incising roll operating to impart the color to the incisions as they are created.

Although there is shown and described herein a preferred embodiment of the invention, its application is not necessarily confined thereto, but may be used either in its entirety or in part, and either with or without modifications, without departing from the spirit of the invention. For example, it is not intended to limit the application of the present invention to a particular form of construction or arrangement of parts, these being considered as suggestive only, and I deem myself entitled to all such uses, modifications and variations thereof as fall within the spirit and scope of the claims hereto appended.

Having now described my invention and in what manner the same may be used, what I claim as new and desire to protect by Letters Patent is:

1. A machine for forming cuts or incisions beneath the surface of material for creating a pattern thereon, comprising a shaft, a plurality of annular discs mounted on said shaft, each of said discs being rotatable relative to said shaft, means for normally holding said discs in non-rotative position relative to said shaft, the peripheral edge of each disc being serrated to form incisors, each of said discs having a distinctive groove at one point on its periphery, each of said discs being rotatable on said shaft to bring said grooves into alignment to form a point from which said discs may be rotated relative to said shaft to cause said incisors to create a desired pattern.

2. A machine for forming cuts or incisions beneath the surface of material for creating a pattern thereon, comprising a shaft, a plurality of annular discs mounted on said shaft, each of said discs being rotatable relative to said shaft, means for normally holding said discs in non-rotative position relative to said shaft, the peripheral edge of each disc being serrated to form incisors, each of said discs having a distinctive groove at one point on its periphery for determining the pattern to be created by said incisors.

3. A machine for forming cuts or incisions beneath the surface of material for creating a pattern thereon, comprising a shaft, a plurality of independently rotatable annular discs mounted on said shaft, the peripheral edge of each of said discs being serrated to form incisors, a plurality of grooves arranged longitudinally in the periphery of said shaft, an electrical heating element disposed in each of said grooves in engagement with said discs, and a distributor ring interconnecting all of said heating elements for supplying electrical energy uniformly to all of said heating elements to heat said discs.

4. A machine for forming cuts or incisions beneath the surface of material for creating a pattern thereon, comprising a shaft, a plurality of annular discs mounted on said shaft, the peripheral edge of each of said discs being serrated to form incisors, means for heating said incisors, and means for advancing material through said machine at a speed determined to cause said incisors to produce clean-cut incisions in said material without branding or burning said material during contact therewith.

5. In a machine for forming cuts or incisions in the surface of a material to create a pattern thereon, an annular disc adapted to be mounted on a shaft, and having incisors on the periphery thereof to form said cuts or incisions, the cutting edges of said incisors lying in a plane parallel to a face of said disc, and notches between said incisors, said notches being formed at an angle of approximately 45° with said face, said incisors thereby being generally wedge-shaped and having bases in the form of parallelograms.

6. In a machine for forming cuts or incisions in the surface of a material to create a pattern thereon, an annular disc adapted to be mounted on a shaft, and having incisors on the periphery thereof to form said cuts or incisions, the cutting edges of said incisors lying in a plane parallel to a face of said disc, notches between said incisors, said notches being formed at an angle of approximately 45° with said face, said incisors thereby being generally wedge-shaped and having bases in the form of parallelograms, and an indicium on the periphery of said disc to indicate its orientation when mounted on a shaft.

7. In a machine for forming cuts or incisions beneath the surface of material for creating a pattern thereon, a shaft, a plurality of annular discs rotatively mounted on said shaft, the peripheral edge of each disc being serrated to form incisors, an indicium on a peripheral portion of each disc whereby said discs may readily be rotated on said shaft to produce a predetermined pattern, and means for normally holding said discs in non-rotative position relative to said shaft.

8. A wood surface incising machine comprising a plurality of discs forming an incising roller, the peripheral edge of each of said discs being serrated to form incisors, means to heat said incisors, and means to feed material through said machine at a speed so that said incisors will produce clean-cut incisions in said material without branding or burning said material during contact therewith.

SAM MAURER.